United States Patent [19]

Hirano et al.

[11] Patent Number: 4,506,754
[45] Date of Patent: Mar. 26, 1985

[54] MOTORCYCLE FRAME WITH ADJUSTABLE AND COMPACT RIDER SUPPORT

[75] Inventors: Seiji Hirano, Fullerton; Raymond N. Weyl, Lawndale, both of Calif.

[73] Assignee: Yamaha Hatsudoki Kabushiki Kaisha, Iwata, Japan

[21] Appl. No.: 409,146

[22] Filed: Aug. 18, 1982

[51] Int. Cl.³ .............................................. B62J 1/00
[52] U.S. Cl. ................................... 180/219; 280/291; 297/283
[58] Field of Search ................. 180/219, 227, 228; 280/220, 291; 297/283

[56] References Cited

U.S. PATENT DOCUMENTS

| D. 267,168 | 12/1982 | Omholt | D12/11 |
|---|---|---|---|
| 1,164,122 | 12/1915 | St. Yves | 180/219 |
| 2,792,899 | 5/1957 | Piatti | 180/227 X |
| 3,698,503 | 10/1972 | Koyama | 180/219 |
| 3,897,842 | 8/1975 | Rheaume | 180/219 |
| 3,913,974 | 10/1975 | Bowen | 297/195 |
| 4,091,887 | 5/1978 | Kurata | 180/219 X |
| 4,339,964 | 7/1982 | Isaka | 74/606 R |
| 4,374,549 | 2/1983 | Lacroix | 180/227 X |

FOREIGN PATENT DOCUMENTS

| 175543 | 4/1905 | Fed. Rep. of Germany | 180/219 |
|---|---|---|---|
| 472327 | 6/1952 | Italy | 180/219 |

*Primary Examiner*—John A. Pekar
*Attorney, Agent, or Firm*—Donald D. Mon

[57] ABSTRACT

A motorcycle in which the rider is comfortably seated in an adjustable support for his torso and feet, and in which the envelope of the motorcycle can be kept to a minimum so the rider can ride in an optimally comfortable position. A footrest and a seat are provided so the feet of the rider are axially forward of the rider's knees, as viewed in plan, and either the footrest or seat or both is adjustably movable so the axial distance between them can adjustably be varied. An engine on the frame can be mounted with its crankcase beneath the seat, and with its cylinders extending forwardly at an angle above the horizontal no greater than about 45°, beneath the thighs of the rider.

11 Claims, 10 Drawing Figures

MOTORCYCLE FRAME WITH ADJUSTABLE AND COMPACT RIDER SUPPORT

FIELD OF THE INVENTION

This invention relates to motorcycles, and especially to adjustable means for comfortably and compactly supporting the rider.

BACKGROUND OF THE INVENTION

Motorcycles are used not only for sports and short distance riding, but also for longer rides which occupy time on the order of many hours. Under these circumstances, riding postures which are suitable for more vigorous short term operation, are not as desirable for touring (long distance) operation. Also, it is a useful objective to enable support means on a motorcycle readily to be adjustable to receive riders of varying skeleton and torso height and size, and to permit a rider to re-adjust his seating configuration from time to time to reduce his fatique.

Furthermore, for many types of operation, a posture more nearly related to the operation of an automobile, in which the legs are comfortably extended, is more suitable than the classical motorcyclist's posture, which is more upright.

Motorcycles, as they have developed, have in general not supplied means for the ready adjustment of support means for the rider. This may in part be a reflection of the fact that the envelope of the motorcycle, while it is well to limit its length and breadth, still must accommodate the engine, and systems for steering, suspension, and auxiliary functions, such as lighting, and operating controls such as throttles and brakes.

It is an object of this invention to provide a motorcycle in which the rider can be accommodated compactly and comfortably, and whose posture can adjustably be changed, or which can be adjusted to accommodate riders of various skeletal and torso lengths and sizes.

BRIEF DESCRIPTION OF THE INVENTION

This invention is carried out in a motorcycle that has a frame with a forwardly-directed axis and a dimension of height. An engine and a forward and a rear wheel are mounted to the frame. Steering means rotates a steering post to steer the front wheel. Seat means and footrest means are mounted to the frame, and one of them is adjustably movable. The footrest means is located sufficiently forwardly of the seat means that the feet of a rider seated on the seat means are axially forward of his knees, as viewed in plan.

According to various optional features of the invention, (a) either the footrest means or the seat means can be fixed, (b) the footrest can be on a slide or can be on a rotatable arm, (c) push-pull means can be provided to adjust the footrest, (d) the backrest of a fixed seat base is movable to adjust the seat means, (e) the seat means can be mounted on a slide, and (f) the crankcase of the engine can be beneath the seat means, with the cylinder angled forwardly and upwardly, not more than 45° above the horizontal, beneath the rider's thighs.

The above and other features of the invention will be fully understood from the following detailed description and the accompanying drawings, in which:

DETAILED DESCRIPTION OF THE INVENTION

Figure 1:
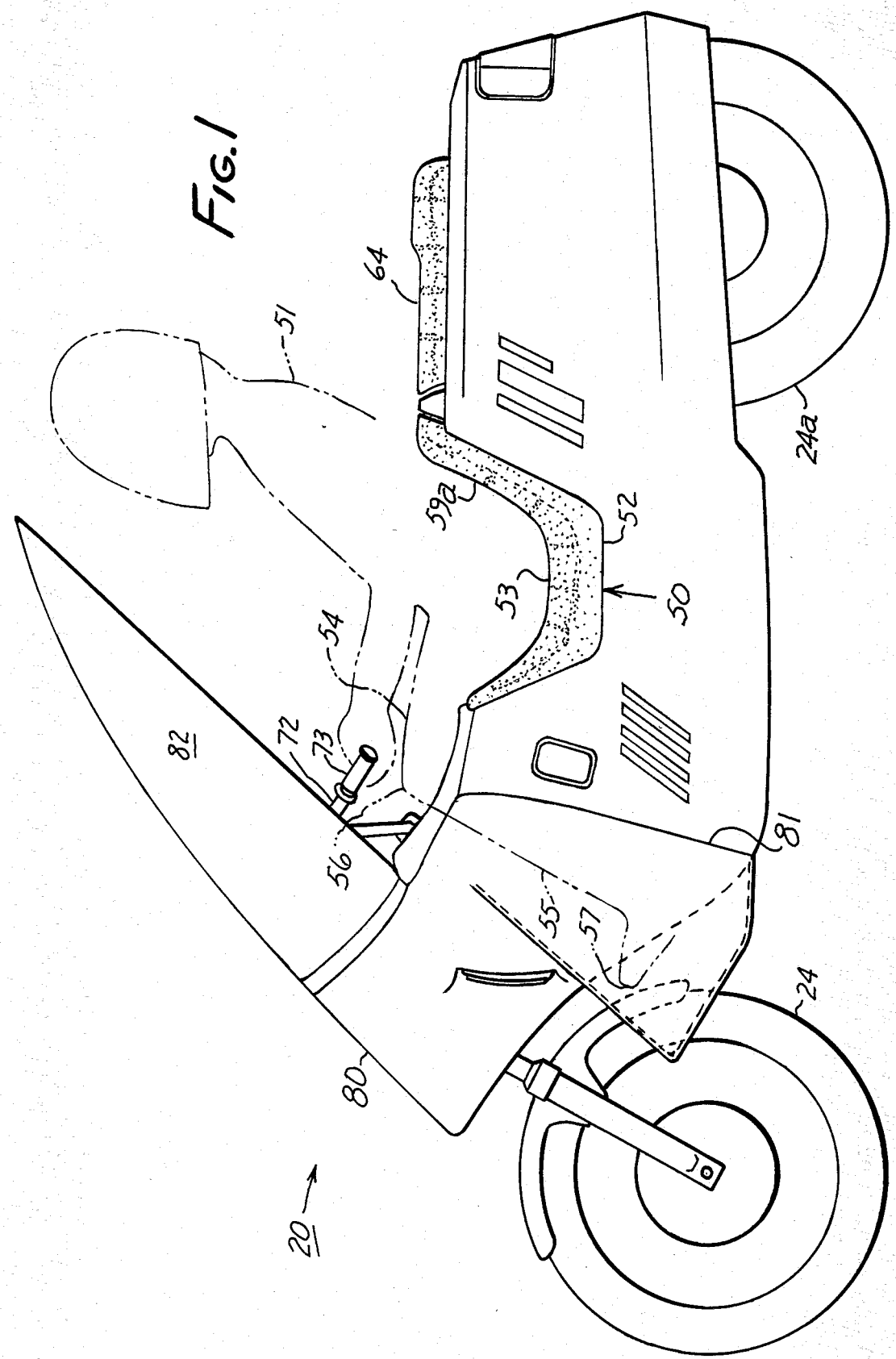
FIG. 1 is a side elevation of a general showing of a motorcycle incorporating and adapted to incorporate the invention.
Figure 2:
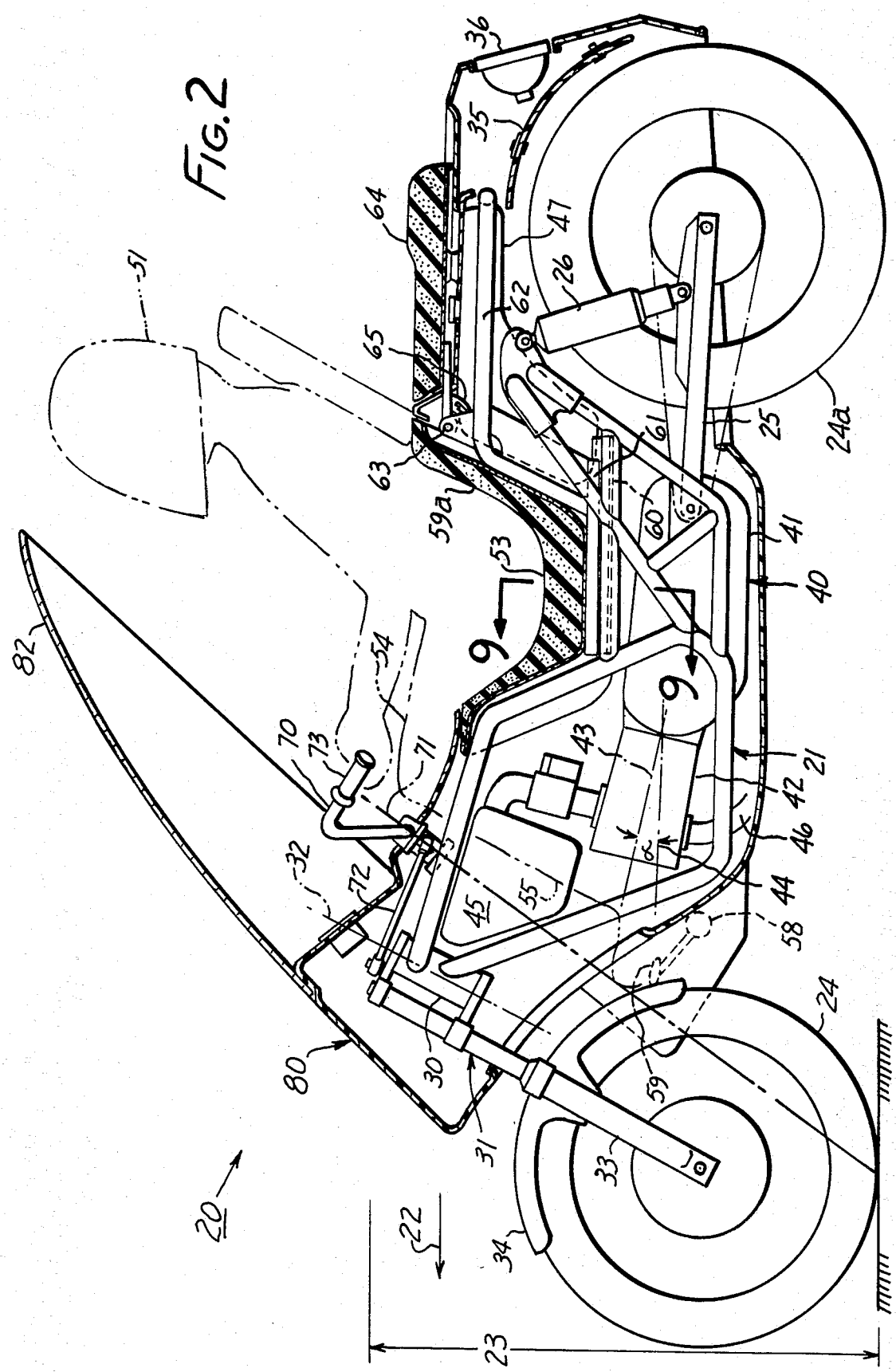
FIG. 2 is a axial section showing the presently-preferred embodiment of the invention.

A motorcycle 20 is shown in FIGS. 1 and 2 having a welded tube frame 21. The frame has a forward axis 22 and a dimension of height 23. It serves ultimately to mount, and to be supported by, a steerable front wheel 24 and a rear wheel 24a.

Rear wheel 24a is supported on a pivotally mounted rear fork 25 that is opposed by a spring-loaded shock absorber 26 which is pivotally mounted to the frame and to the fork.

A steering head pipe 30 is attached to the frame, such as by welding, and rotatably mounts a steering post 31 for rotation around a steering axis 32. The steering post includes the usual fork 33 to journal the front wheel and to support front fender 34.

A rear fender 35 is supported by the frame, and a tail light 36 is provided near the rear end of the motorcycle.

An engine 40 is mounted to the frame with a crankcase 41 and a cylinder (or cylinders) 42. The cylinders has a respective cylinder axis 43 that extends forwardly and is inclined upwardly relative to the horizontal 44. An angle $\alpha$ is formed between axis 43 and the horizontal 44, which is no greater than about 45°. The motorcycle is additionally fitted with a fuel carburetion and induction system 45, and an exhaust system 46, which systems are only schematically shown. As usual, they include fuel tanks, carburetors, induction and exhaust controls, ignition means, and silencers or mufflers. Except for the location and orientation of the crankcase, the cylinders, and the cylinder axes, the engine and accessory systems are not critical to this invention, and will not be described in further detail here. They are conventional.

Seat means 50 is mounted to the frame, partially to support a rider 51. It may conveniently be a fabric or leather covered foam cushion 52 shaped generally as a saddle with a depressed central portion 53 to receive the buttocks of the rider, and to permit his thighs 54 to straddle the motorcycle. His tibia 55 extend downwardly and forwardly from his knees 56, and his feet 57 rest upon footrest means 58 attached to the frame, one on each side of the frame. A brake pedal 59 is located near one of the footrests so it can be actuated by a foot resting on the foot rests.

Figure 9:
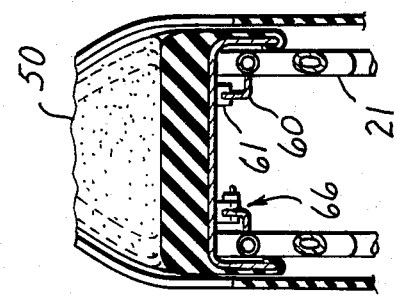
FIG. 9 is a fragmentary section taken at line 9—9 in FIG. 2.

Seat means 50 has a lower backrest 59a integral with the central portion. A seat rail 60 is attached to the frame by welding. A seat slider 61 is slidably mounted to the seat slide rail. It supports the seat for adjustable sliding movement forwardly and rearwardly. A rear support 62 is mounted to the seat slider, also for forward and rearward movement. It carries a pivot 63 to which an upper backrest 64 is pivotally mounted. Quadrant-type adjustment means 65 enables the upper backrest to be adjusted angularly, for example out of the way as in solid line (where it can become a passenger seat) or upwardly as shown in dashed line, where it supports the upper back and shoulders of the rider. Releasable adjustment means 66 (FIG. 9) is provided to hold the seat member at a selected axial position. A fuel tank 47 is mounted to the rear support 62.

A handle 70 is pivotally mounted to the frame by a handle pivot 70a. The handle has a turning axis 71 in pivot 70a, which is behind steering axis 32, and is directed so as to intersect the ground where the front wheel contacts it. Connecting means 72 interconnects the handle to the steering post, as will later be described. While the grip portions 73 of the handles can be raised and lowered by rotating the handle around a horizontal axis, their forward and rearward position is not adjustable in this embodiment.

A cowling 80 surrounds the frame and engine. It is straddled by the rider. A boot 81 on each side admits the rider's feet. The footrest means project into the region between the boots and the cowling. A windscreen 82 is formed ahead of the steering post. Ample clearances are provided so the moving parts do not strike the cowling.

Figure 4:
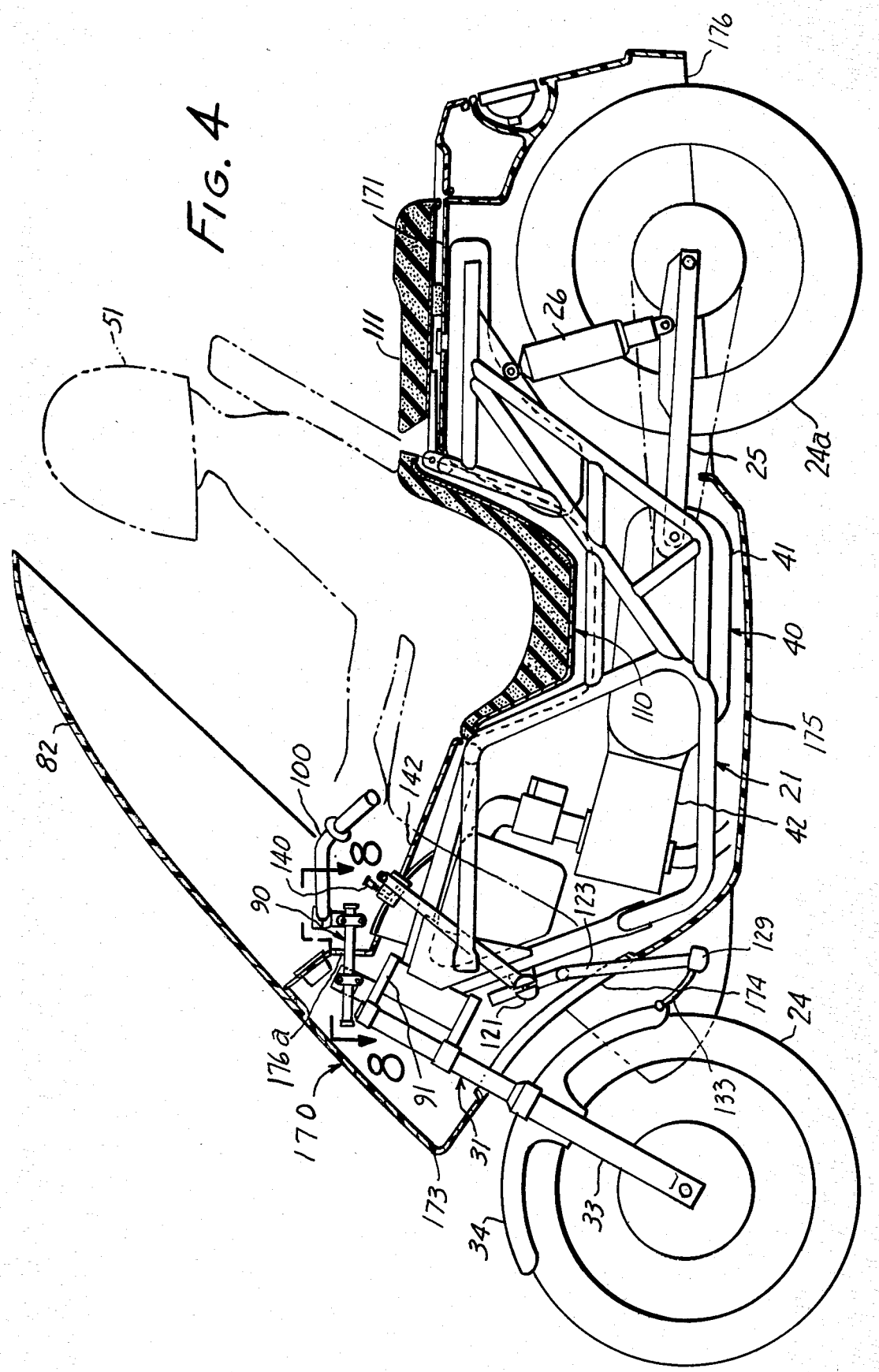
FIGS. 4 and 5 are respectively an axial section and a detailed section of the embodiment of FIG. 3.
Figure 8:
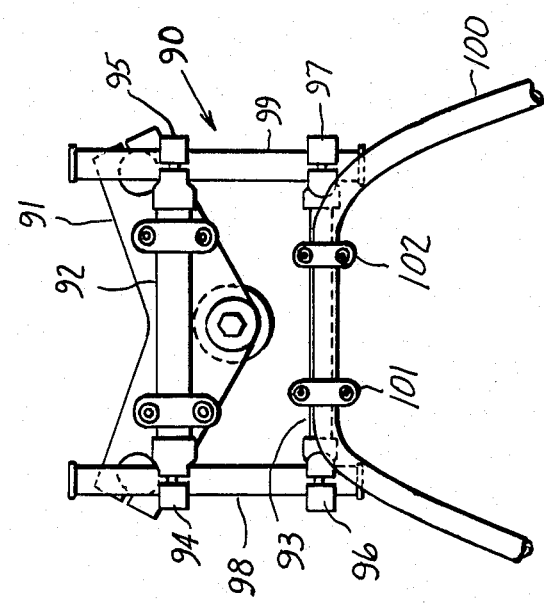
FIG. 8 is a fragmentary section taken at line 8—8 in FIG. 4.

In FIGS. 4 and 8 there is shown a linkage 90 to turn the steering post. In this embodiment there is no handle pivot. Instead, the handle is mounted directly to the steering post. However, in this embodiment, the handles can be adjusted forwardly and rearwardly by adjustment of the linkage. The linkage includes a base plate 91 attached to the steering post, to which a first cross member 92 is attached. A second cross member 93 is parallel to cross member 92 and is rearwardly spaced from it. Clamps 94 and 95 are carried by the first cross member, and clamps 96 and 97 are carried by the second cross member. Slide members 98 and 99 are adjustably gripped respectively in clamps 94, 96 and 95,97. Handle 100 is rotatably adjustably mounted to the second cross member by clamps 101 and 102. Thus, handle 100 can be adjusted rotationally around a horizontal axis, and adjustably moved forwardly and rearwardly, all by releasing the clamps, adjusting the parts appropriately, and re-tightening the clamps.

Figure 3:
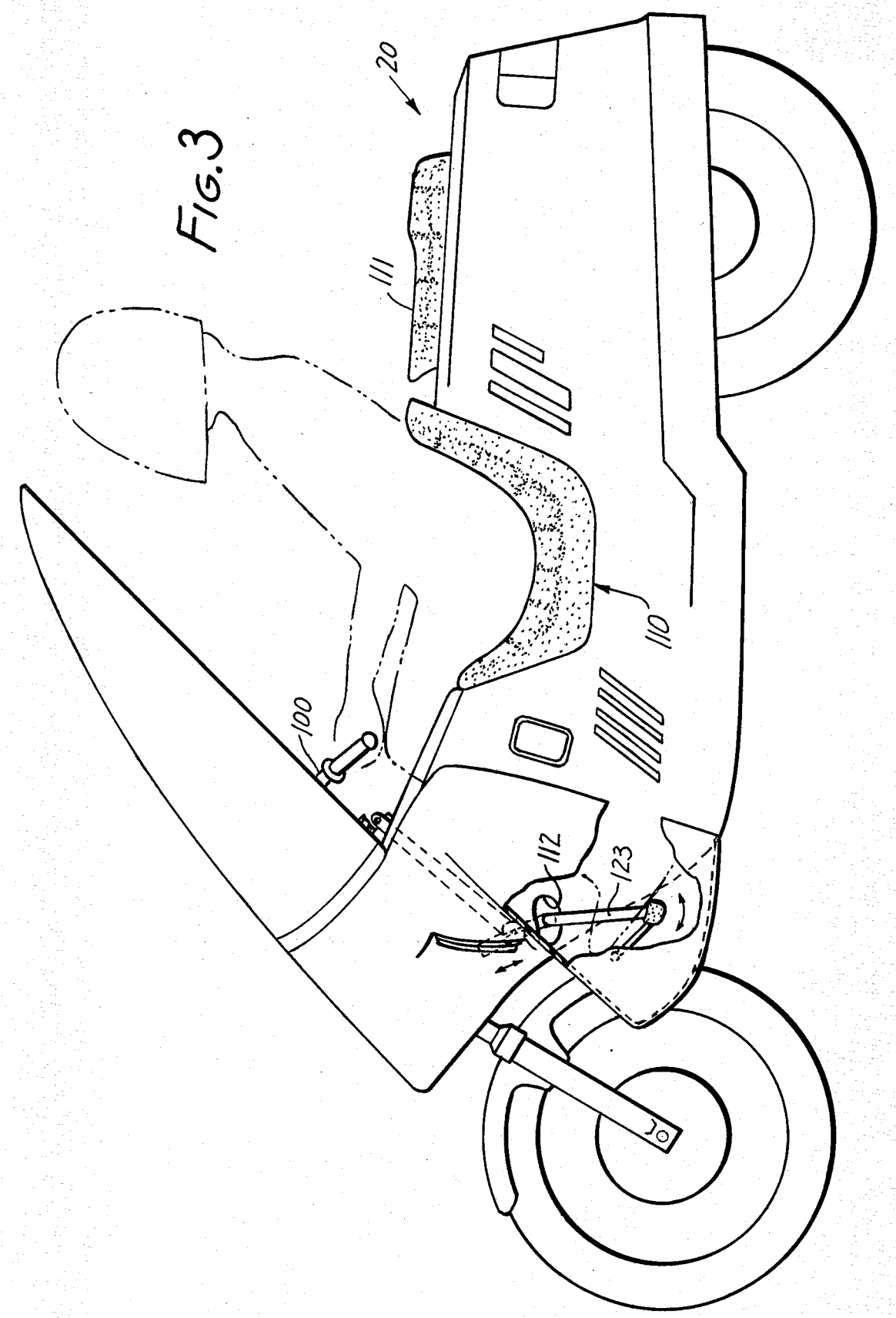
FIG. 3 is a side view of a motorcycle similar to that in FIG. 1, partly cutaway to show an optical feature of the invention.

In FIGS. 3 and 4, seat means 110, generally shaped as in FIGS. 1 and 2, is rigidly fixed to the frame. So is its upper backrest 111 (also useful as a seat). The upper backrest can, as in FIGS. 1 and 2 be adjusted to an upright or intermediate position.

Figure 5:
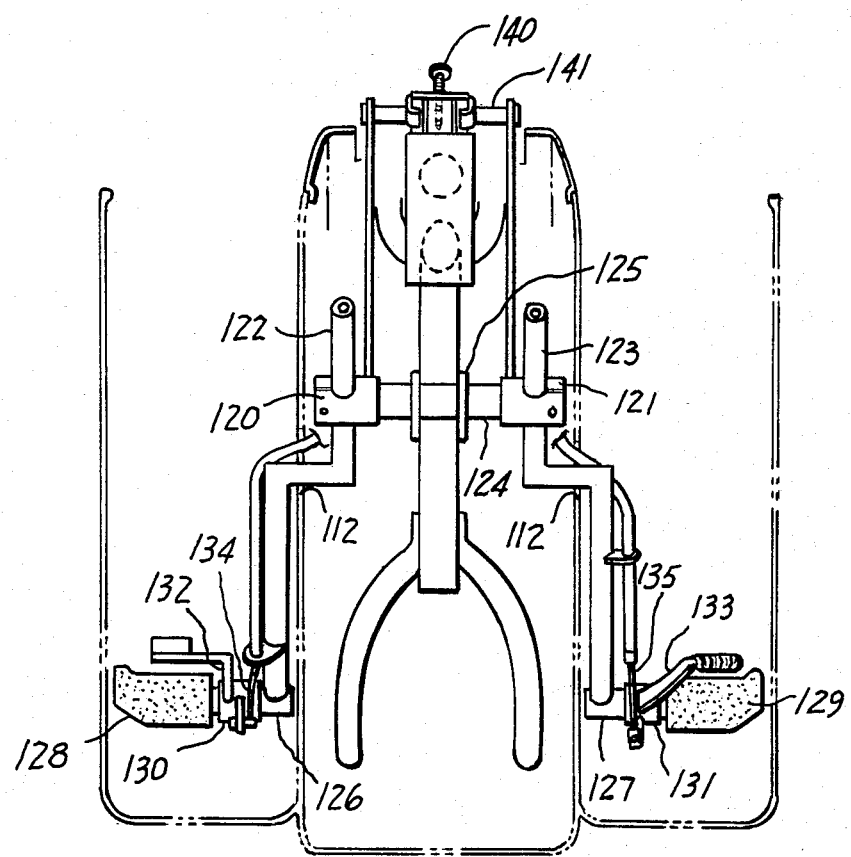

In FIG. 3, an arcuate slot 112 is shown which enables the arm 123 of the footrest to be rotated in order to adjust the location of the footrest (see FIG. 5).

FIGS. 3–5 show an improvement in the adjustment of the footrest. Two clamps 120, 121 are provided, one on each side of the frame to receive a respective arm 122, 123. The clamps are mounted to a rotatable shaft 124 in journal 125. At the end of each arm there is a laterally extending rod 126, 127 with a footrest 128, 129 at its end. Medially there is a bearing 130, 131 rotatably mounted to the respective rod. A brake pedal 132 and a change (shift) pedal 133 are mounted to respective bearings. Push-pull cables 134, 135 are connected to pedals 132 and 133 to apply the brakes or to shift the transmission when the respective pedals are moved by a foot resting on the footrest. A spring loaded detent 140 is connected to a central portion 141 that connects the two levers. Central portion 141 passes through a slot 142 in the cowling with a plurality of holes into which the detent can selectively be inserted to hold a selected adjustment. When the detent is released, it enables the levers to be pivoted to change the footrest location. When locked, it holds the adjustment. Again in this embodiment, the distance between the footrest and the seat means is axially adjustable as viewed in plan, but in this arrangement further adjustments are also enabled.

It should be observed that the seat adjustment in this invention is adjustable while the vehicle is travelling. In conventional motorcycles, the adjustment can be made only when it is standing still.

Figure 6:
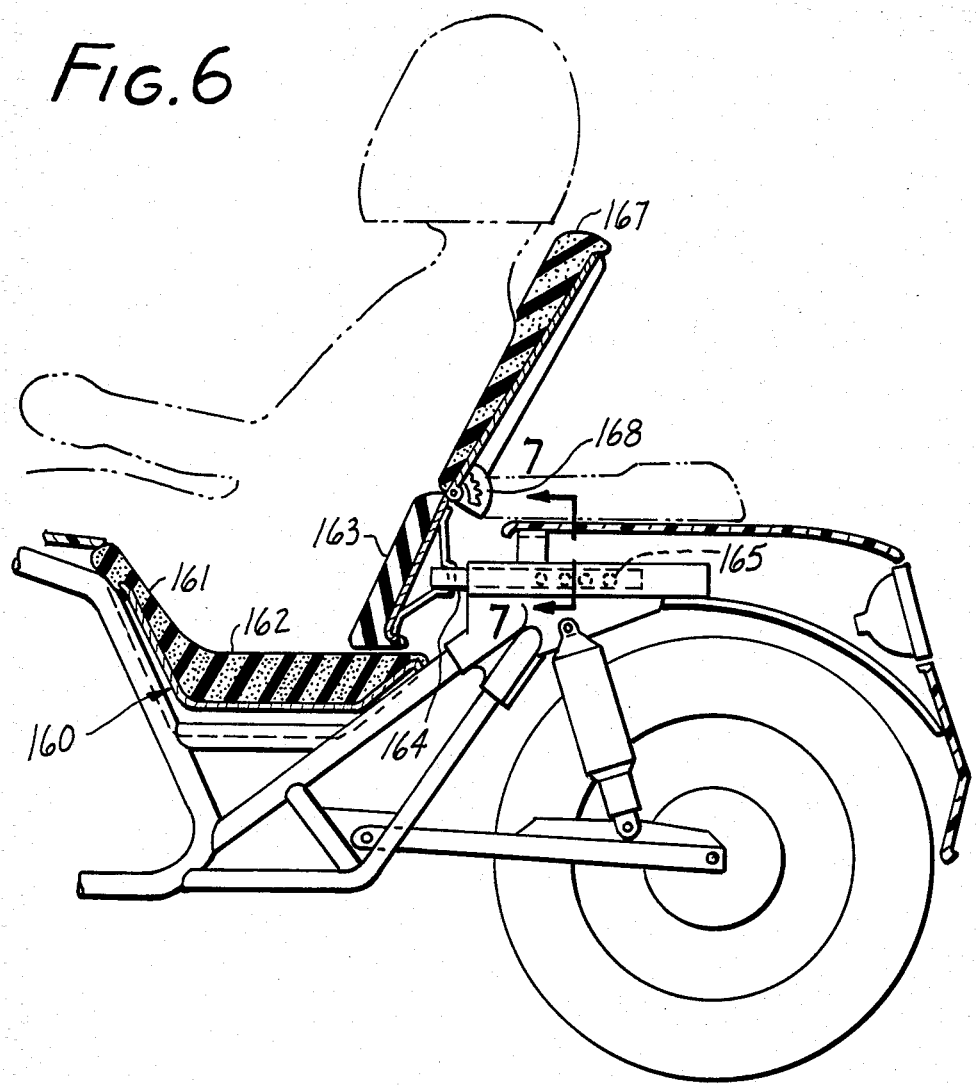
FIG. 6 is a fragmentary axial section showing another embodiment of an optional feature of the invention.
Figure 7:
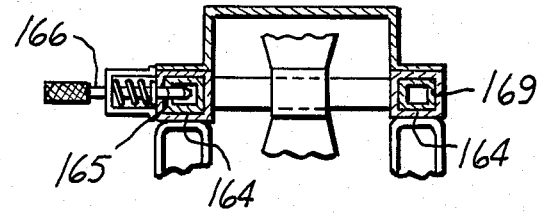
FIG. 7 is a cross-section taken at line 7—7 in FIG. 6.

FIGS. 6 and 7 show a modification of seat means 160. In this embodiment the front and central portions 161, 162 are fixed, and the lower backrest portion 163 is adjustable. The lower backrest portion has a two part extension 164, one of which has detent passages 165 in its sides. Adjacent to this extension is a spring-loaded detent pin 166 that is biased to fit into the holes to hold an adjustment, but able to be withdrawn to enable a sliding adjustment to be made. An upper backrest portion 167 is pivotally mounted to the upper end of the lower backrest portion. A quadrant-type gear adjustment 168 enables the angular position of portion 167 to be adjusted. Extensions 164 are supported in slideways 169 mounted to the frame as shown in FIG. 7.

Figure 10:
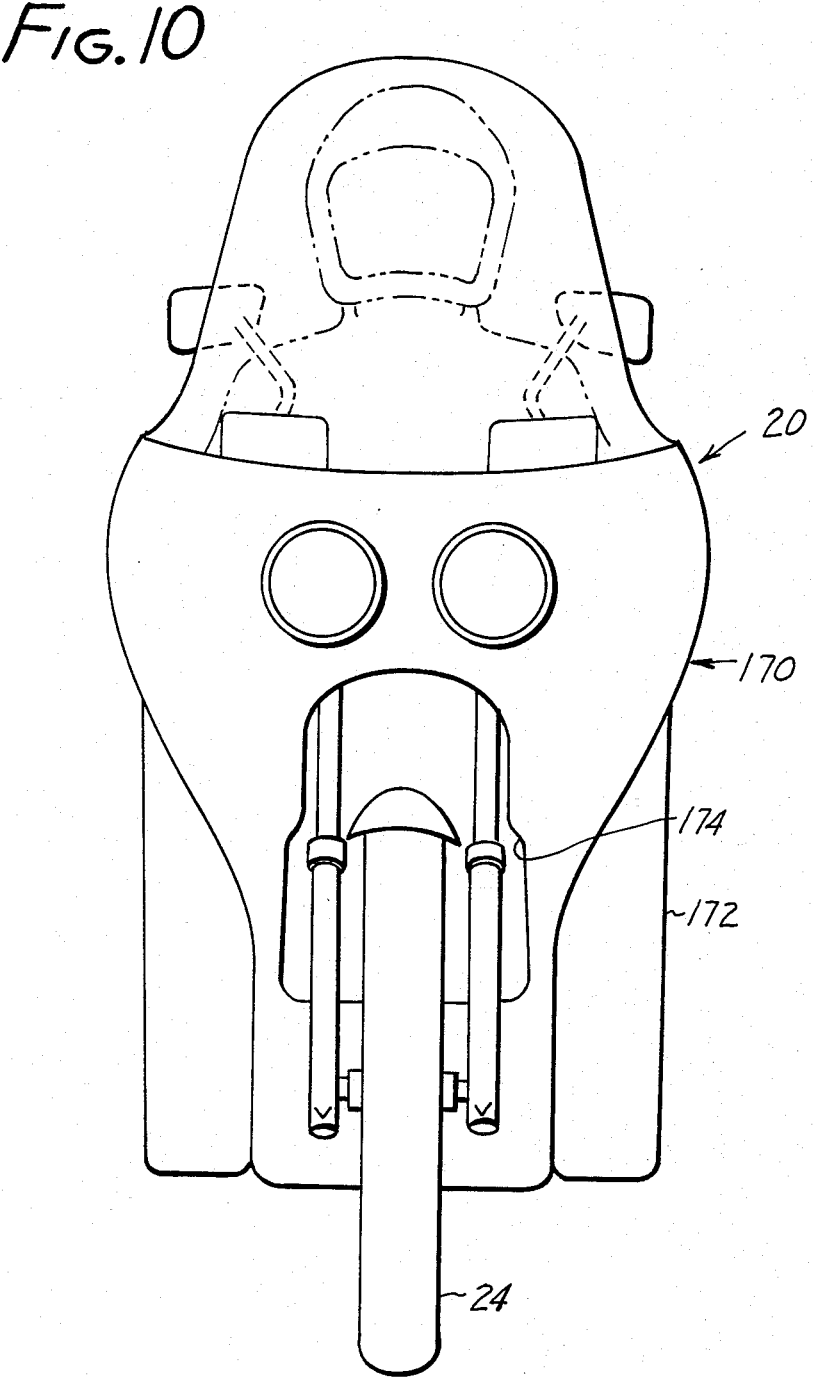
FIG. 10 is a front elevation of a motorcycle showing yet another optional feature of the invention.

FIGS. 4 and 10 show the cowling and windscreen and coupling in greater detail. The cowling 170 has a rearward section 171 that straddles the frame and engine, and the rider straddles it. Boot 172 receives the rider's legs, and shields them from the wind. A forward section 173 extends forwardly of the engine and has an opening 174 to pass the steering fork and also admits cooling air to the region around the engine. A bottom portion 175 covers the under surface, but leaves an opening 176 for heated air to leave. The forward section is positioned ahead of the handles, and protects the handles and the driver's hands from the wind. The rearward section has a slot 176a to enable the handle to turn.

When the crankcase is located forwardly of the rider, there is no room for a cylinder to lie nearly horizontally, because the wheel base would have to be lengthened to accommodate it, and this is not an acceptable solution. Instead its cylinders would have to be upright, and this undesirably increases the height and width ahead of the rider. With the crankcase beneath the rider, the cylinders can be laid nearly horizontally, thereby reducing height and width ahead of the rider. Furthermore, with the crankcase beneath the rider, the drive train to the rear wheel can be shortened.

In addition, placing the crankcase beneath the seat, and the cylinder well beneath the rider's thighs, the heat transmitted to his thighs when standing still is reduced, and the heat transmitted to the seat and to the thighs is reduced while the motorcycle is travelling.

This invention thereby provides a motorcycle with an optimum envelope in which the driver is comfortably seated in an adjustable manner, and in which he is sheltered from the major part of adverse environmental effects such as wind, rain and snow.

It will be recognized that the various features disclosed herein can be assembled in any useful combination. Therefore, this invention is not to be limited by the embodiments shown in the drawings and described in the description, which are given by way of example and not of limitation, but only in accordance with the scope of the appended claims.

We claim:

1. A motorcycle comprising:
a frame having a forwardly-directed axis and a dimension of height;
an engine mounted to said frame;
a rear wheel drivingly connected to said engine;
a forward wheel;
a steering post mounting said forward wheel to said frame and rotatable around a steering axis;
a steering means attached to said steering post for turning the post to steer the motorcycle, said forward wheel being forward of, and in line with said rear wheel;
seat means mounted to said frame, slidably adjustable along said forwardly-directed axis; and
footrest means mounted to said frame, the position of said footrest means being adjustably movable relative to said frame whereby the distance between said seat means and said footrest means is adjustable, said footrest means being located sufficiently forwardly of said seat means that the feet of a rider seated on said seat means will be axially forward of his knees, all as viewed in plan, said footrest means including an arm mounted to said frame and disposed at an angle to said forwardly-directed axis; and a footrest attached to said arm so that movement of the arm moves the footrest.

2. A motorcycle according to claim 1 in which said arm is angularly adjustable whereby to vary said distance.

3. A motorcycle according to claim 2 in which a pedal is rotationally mounted to said footrest and in which push-pull means is connected to said pedal to control a motorcycle function, said pedal moving with said footrest.

4. A motorcycle comprising:
a frame having a forwardly-directed axis and a dimension of height;
an engine mounted to said frame;
a rear wheel drivingly connected to said engine;
a forward wheel;
a steering post mounting said forward wheel to said frame and rotatable around a steering axis;
steering means attached to said steering post for turning the post to steer the motorcycle, said forward wheel being forward of, and in line with said rear wheel;
seat means mounted to said frame, slidably adjustable along said axis; and
footrest means mounted to said frame,
the position of said footrest means being adjustably movable relative to said frame whereby the distance between said means and said seat means is adjustable, said footrest means being located sufficiently forwardly of said seat means that the feet of a rider seated on said seat means will be axially forward of his knees, all as viewed in plan, said arm being pivotally attached to the frame, and can be shifted to vary the distance between the footrest and the point of pivotal attachment.

5. A motorcycle comprising:
a frame having a forwardly-directed axis and a dimension of height;
an engine mounted to said frame;
a rear wheel drivingly connected to said engine;
a forward wheel;
a steering post mounting said forward wheel to said frame and rotatable around a steering axis;
steering means attached to said steering post for turning the post to steer the motorcycle, said forward wheel being forward of, and in line with said rear wheel;
seat means mounted to said frame; and
footrest means mounted to said frame, the position of said footrest means being adjustably movable relative to said frame whereby the distance between said footrest means and said seat means is adjustable, said footrest means being located sufficiently forwardly of said seat means that the feet of a rider seated on said seat means will be axially forward of his knees, all as viewed in plan, said footrest means including an arm mounted to said frame and disposed at an angle to said forwardly-directed axis, and a footrest attached to said arm so that movement of the arm moves the footrest.

6. A motorcycle according to claim 5 in which said arm is angularly adjustable whereby to vary said distance.

7. A motorcycle according to claim 6 in which a pedal is rotationally mounted to said footrest and in which push-pull means is connected to said pedal to control a motorcycle function, said pedal moving with said footrest.

8. A motorcycle comprising:
a frame having a forwardly-directed axis and a dimension of height;
an engine mounted to said frame;
a rear wheel drivingly connected to said engine;
a forward wheel;
a steering post mounting said forward wheel to said frame and rotatable around a steering axis;
steering means attached to said steering post for turning the post to steer the motorcycle, said forward wheel being forward of, and in line with said rear wheel;
seat means mounted to said frame; and
footrest means mounted to said frame, one of said seat means and footrest means being adjustably movable relative to said frame whereby the distance between said footrest means and said seat means is adjustable, said footrest means being located sufficiently forwardly of said seat means that the feet of a rider seated on said seat means will be axially forward of his knees, all as viewed in plan, said seat means comprising a base on which the rider sits which is fixed, and a lower backrest immediately adjacent to the rising above said base, said lower backrest being adjustably slideable in said axial direction.

9. A motorcycle according to claim 8 in which an upper backrest is adjustably tiltably mounted to said lower backrest.

10. A motorcycle according to claim 8 in which the position of said footrest means is adjustable whereby to vary the distance between it and said seat means.

11. A motorcycle comprising:
a frame having a forwardly-directed axis and a dimension of height;
an engine mounted to said frame;
a rear wheel drivingly connected to said engine;
a forward wheel;
a steering post mounting said forward wheel to said frame and rotatable around a steering axis;

steering means attached to said steering post for turning the post to steer the motorcycle, said forward wheel being forward of, and in line with said rear wheel;

seat means mounted to said frame; and footrest means comprising an arm mounted to said frame and disposed at an angle to said forwardly-directed axis, and a footrest attached to said arm, the position of said footrest means being adjustably movable relative to said frame whereby the distance between said footrest and said seat means is adjustable, said footrest being located sufficiently forwardly of said seat means that the feet of a rider seated on said seat means will be axially forward of his knees, all as viewed in plan, said arm being pivotally attached to the frame, and shiftable to vary the distance between the footrest and its point of pivotal attachment.

* * * * *